(12) United States Patent
Nanopoulos et al.

(10) Patent No.: US 8,966,276 B2
(45) Date of Patent: Feb. 24, 2015

(54) SYSTEM AND METHOD PROVIDING DISCONNECTED AUTHENTICATION

(75) Inventors: Andrew Nanopoulos, Wakefield, MA (US); Karl Ackerman, Boston, MA (US); Piers Bowness, Westford, MA (US); William Duane, Westford, MA (US); Markus Jakobsson, Bloomington, IN (US); Burt Kaliski, Wellesley, MA (US); Dmitri Pal, Framingham, MA (US); Shane D. Rice, Boston, MA (US); Ronald L. Rivest, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 2057 days.

(21) Appl. No.: 10/938,422

(22) Filed: Sep. 10, 2004

(65) Prior Publication Data

US 2005/0166263 A1    Jul. 28, 2005

Related U.S. Application Data

(60) Provisional application No. 60/502,546, filed on Sep. 12, 2003.

(51) Int. Cl.
*G06F 21/00*     (2013.01)
*H04L 29/06*     (2006.01)
(Continued)

(52) U.S. Cl.
CPC ............ *H04L 63/0838* (2013.01); *G06F 21/31* (2013.01); *G06F 21/34* (2013.01);
(Continued)

(58) Field of Classification Search
CPC . G06F 21/31; G06F 21/34; G06F 2221/2103; H04L 9/3271; H04L 63/0838; H04L 9/002; H04L 9/3228; H04L 9/3234; H04L 9/3236; H04L 63/0853; H04L 2209/80; H04L 2209/38
USPC ................ 726/4, 8, 9, 10; 713/183, 184, 185
See application file for complete search history.

(56) References Cited

U.S. PATENT DOCUMENTS

| 4,609,777 A | 9/1986 | Cargile |
| 4,720,860 A | 1/1988 | Weiss |

(Continued)

FOREIGN PATENT DOCUMENTS

| CN | 1181560 A | 5/2008 |
| EP | 1 255 392 A2 | 6/2002 |

(Continued)

OTHER PUBLICATIONS

PCT/US2004/029776 Partial Search Report.

(Continued)

*Primary Examiner* — Harunur Rashid
(74) *Attorney, Agent, or Firm* — Daly, Crowley, Mofford & Durkee, LLP

(57) ABSTRACT

In a system for disconnected authentication, verification records corresponding to given authentication token outputs over a predetermined period of time, sequence of events, and/or set of challenges are downloaded to a verifier. The records include encrypted or hashed information for the given authentication token outputs. In one embodiment using time intervals, for each time interval, token output data, a salt value, and a pepper value, are hashed and compared with the verification record for the time interval. After a successful comparison, a user can access the computer. A PIN value can also be provided as an input the hash function. A portion of the hash function output can be used as a key to decrypt an encrypted (Windows) password, or other sensitive information.

59 Claims, 4 Drawing Sheets

(51) Int. Cl.
*G06F 21/31* (2013.01)
*G06F 21/34* (2013.01)
*H04L 9/32* (2006.01)
*H04L 9/00* (2006.01)

(52) U.S. Cl.
CPC ......... *H04L 9/3271* (2013.01); *H04L 63/0853* (2013.01); *H04L 9/002* (2013.01); *H04L 9/3228* (2013.01); *H04L 9/3234* (2013.01); *H04L 9/3236* (2013.01); *G06F 2221/2103* (2013.01); *H04L 2209/38* (2013.01); *H04L 2209/80* (2013.01)
USPC ............... 713/183; 713/184; 713/185; 726/8; 726/10

(56) References Cited

U.S. PATENT DOCUMENTS

| | | | |
|---|---|---|---|
| 5,528,231 A | | 6/1996 | Patarin |
| 5,737,421 A | | 4/1998 | Audebert |
| 5,787,169 A | * | 7/1998 | Eldridge et al. ............. 713/165 |
| 5,995,624 A | * | 11/1999 | Fielder et al. ................ 713/169 |
| 6,064,736 A | * | 5/2000 | Davis et al. ................... 713/155 |
| 6,067,621 A | | 5/2000 | Yu et al. |
| 6,115,472 A | * | 9/2000 | Shimizu et al. ............... 380/262 |
| 6,154,543 A | * | 11/2000 | Baltzley ......................... 380/255 |
| 6,173,400 B1 | * | 1/2001 | Perlman et al. ............... 713/172 |
| 6,178,508 B1 | * | 1/2001 | Kaufman ....................... 713/183 |
| 6,263,446 B1 | * | 7/2001 | Kausik et al. ..................... 726/5 |
| 6,339,828 B1 | * | 1/2002 | Grawrock et al. ............. 713/183 |
| 6,484,174 B1 | * | 11/2002 | Wall et al. .......................... 707/9 |
| 6,523,027 B1 | | 2/2003 | Underwood |
| 6,766,454 B1 | * | 7/2004 | Riggins ......................... 713/185 |
| 6,826,686 B1 | * | 11/2004 | Peyravian et al. ............ 713/168 |
| 6,954,740 B2 | * | 10/2005 | Talker ............................. 705/75 |
| 6,988,210 B1 | * | 1/2006 | Audebert ........................... 726/9 |
| 7,228,438 B2 | * | 6/2007 | Bushmitch et al. ........... 713/193 |
| 7,320,139 B2 | * | 1/2008 | Audebert ........................... 726/5 |
| 7,343,014 B2 | * | 3/2008 | Sovio et al. .................... 380/278 |
| 2002/0034301 A1 | * | 3/2002 | Andersson .................... 380/270 |
| 2002/0095588 A1 | * | 7/2002 | Shigematsu et al. .......... 713/186 |
| 2002/0144128 A1 | * | 10/2002 | Rahman et al. ............... 713/186 |
| 2002/0166048 A1 | | 11/2002 | Coulier |
| 2002/0198848 A1 | * | 12/2002 | Michener ........................ 705/75 |
| 2003/0014315 A1 | * | 1/2003 | Jaalinoja et al. ................ 705/18 |
| 2003/0037261 A1 | * | 2/2003 | Meffert et al. ................. 713/201 |
| 2003/0163739 A1 | * | 8/2003 | Armington et al. ........... 713/202 |
| 2003/0236975 A1 | * | 12/2003 | Birk et al. ...................... 713/156 |
| 2004/0030932 A1 | * | 2/2004 | Juels et al. ..................... 713/202 |
| 2004/0103290 A1 | * | 5/2004 | Mankins ........................ 713/193 |
| 2004/0107146 A1 | * | 6/2004 | Alfano ............................. 705/26 |
| 2005/0067485 A1 | | 3/2005 | Caron |
| 2005/0081045 A1 | * | 4/2005 | Nicodemus et al. .......... 713/182 |

FOREIGN PATENT DOCUMENTS

| | | |
|---|---|---|
| EP | 1 255 392 A3 | 6/2002 |
| EP | 1 320 014 A2 | 6/2003 |
| JP | Hei 02-302141 | 12/1990 |
| JP | Hei 07-271729 | 10/1995 |
| JP | 2002-259344 | 9/2002 |
| JP | 2002-259344 A | 9/2002 |
| JP | 2002-312319 | 10/2002 |
| JP | 2003-122719 | 4/2003 |
| JP | 2003-122719 A | 4/2003 |
| JP | 2003-178027 | 6/2003 |
| WO | WO 9927676 A2 | 6/1999 |
| WO | WO 01/31840 A1 | 5/2001 |
| WO | WO 02/48846 A2 | 6/2002 |
| WO | WO 02/48846 A3 | 6/2002 |
| WO | WO 03/063099 A2 | 7/2003 |

OTHER PUBLICATIONS

N. Haller, A One-Time Password System, Mar. 1, 1998, pp. 1-25.
N. Haller, Belicore, C. Metz, P. Nesser, M. Straw, A One-Time Password System, Feb. 1998, pp. 1-25, Network Working Group.
Niels Provos and David Mazieres, A Future-Adaptable Password Scheme, Jun. 6-11, 1999, pp. 1-13, Monterey, California.
Ronald L. Rivest, Adi Shamir and David A. Wagner, Time-Lock Puzzels and Time-Release Crypto, Mar. 10, 1996, pp. 1-9, Cambridge, Massachusetts.
PCT/US2004/029776 International Search Report dated Jun. 13, 2005.
Office Action dated Jan. 4, 2008 from Chinese Patent Appln. 200480033059.5, National Phase of PCT Appln. (PCT/US2004/029776).
Notice of Allowance dated Aug. 15, 2008 from Chinese Patent Appln. 200480033059.5, National Phase of PCT Appln. (PCT/US2004/029776).
Office Action dated Jan. 28, 2008 from European Patent Application No. 04783839.6.
Response to Office Action, letter dated Jul. 28, 2008, from European Patent Application No. 04783839.6.
Examiner's report from Australian Patent Office dated Jun. 9, 2010, Australian Application No. 20044305800, filed Mar. 10, 2006, 2 pages.
Japanese Office Action dated Nov. 11, 2010 for Japanese Patent Application No. 2006-526361, from which present U.S. Application claims priority, 6 pages.
European Patent Office Examination Report for Application No. 04 783 839.6-1245 dated Jul. 21, 2011, 7 pages.
Japanese Official Action dated Jul. 29, 2013 in Japanese Patent Application No. 2012-014358, partial translation only, 3 pages.
Response Filed Nov. 12, 2013 to Japenese Official Action dated Jul. 29, 2013 in Japanese Patent Application No. 2012-014358, 7 pages.
Patent Examination Report No. 5 dated Sep. 9, 2013, Application No. 2011202930, pp. 1-6.
Japanese Office Action dated Jul. 29, 2013 in Japanese Patent Application No. 2012-014358, translation only, 3 pages.
Response to Examination Report of Nov. 2, 2013, Application No. 2011202930, pp. 1-11.
Office Action in EP Application No. 04 783 839.6 dated Feb. 17, 2014, 3 pages.
Bellovin et al., "Limitations of the Kerberos Authentication System", USENIX, Winter '91, Dallas, TX, 16 pages. [Please Note: we have confirmed with the APO that this reference was mis-cited and that the D6 reference actually considered by the APO examiner is being cited].
Pomeranz "One-Time Passwords", Deer Run Associates, PO Box 20370, Oakland, CA 94620-0370, 2000, 37 pages, http://www.deer-run.com/.
RSA Security "Hardware Token" Jun. 5, 2003, 2 pages, http://web.archive.org/web/20030605112958/http://www.rsasecurity.com/products/securid/hardware_token.html.
RSA-505AEP European Application No. 04783839.6 Response to Office Action dated Jul. 21, 2011 (previously cited) filed on Jan. 31, 2012, 24 pages. European Application No. 04783839.6 Response to Office Action dated Feb. 17, 2014 (previously cited) filed on Aug. 15, 2014, 22 pages.
RSA-505ACN Chinese Application No. 200480033059.5 Response to Office Action of Jan. 4, 2008 (previously cited) filed on Jun. 2, 2008 including foreign associate cover letter dated Jun. 24, 2008 and emailed inventor comments used to prepare response dated May 27, 2008, 17 pages. Chinese Application No. 200480033059.5, Certificate of Invention Patent dated Nov. 12, 2008 and translation thereof, including foreign associate cover letter dated Dec. 18, 2008 and English translation of allowed claims, 13 pages.
RSA-505AAU Australian Application No. 2004305800 Office Action dated Sep. 22, 2009, 2 pages. Australian Application No. 2004305800 Response to Office Action dated Sep. 22, 2009 filed on May 12, 2010, 41 pages. Australian Application No. 2004305800 Response to Office Action dated Jun. 9, 2010 (previously cited) filed on May 16, 2011, 21 pages. Australian Application No. 2004305800 Office Action dated Jun. 7, 2011, 3 pages.
RSA-505AJP Japanese Patent Application No. 2006-526361 Response to Office Action dated Nov. 11, 2010 (previously cited) filed on May 10, 2011, including foreign associate cover letter and

(56) References Cited

OTHER PUBLICATIONS

English translation of claims, 23 pages. Japanese Patent Application No. 2006-526361 Office Action dated Sep. 27, 2011, foreign associate cover letter dated Nov. 22, 2011 only, 4 pages. Japanese Patent Application No. 2006-526361 Response to Office Action dated Sep. 27, 2011 filed on Jan. 26, 2012, including foreign associate email dated Jan. 10, 2012 attaching suggested amended claims, our letter to foreign associate dated Jan. 25, 2012 instructing to file amended claims, foreign associate cover letter dated Mar. 22, 2012 stating response filed on Jan. 26, 2012, 15 pages. Japanese Patent Application No. 2006-526361 Office Action dated Apr. 3, 2012, foreign associate cover letter dated May 1, 2012 English translation of office action and claims only, 6 pages. Japanese Patent Application No. 2006-526361 Response to Office Action dated Apr. 3, 2012 filed on Jun. 7, 2012 including foreign associate cover letter dated Jun. 21, 2012 and English translation of claims, 6 pages. Japanese Patent Application No. 2006-526361 Allowance Report dated Jul. 3, 2012 including foreign associate cover letter dated Jul. 4, 2012, 4 pages. RSA-505BJP Japanese Application No. 2012-014358, copy of Letters Patent and foreign associate cover letter dated Feb. 5, 2014, 5 pages. Japanese Application No. 2012-014358, copy of Japanese Official Patent Gazette dated Mar. 26, 2014, foreign associate cover letter dated Apr. 25, 2014, English translation of particulars of the Japanese Official Patent Gazette and claims as published, 31 pages. RSA-505BAU Australian Application No. 2011202930 $1^{st}$ Office Action dated Mar. 26, 2012, 2 pages. Australian Application No. 2011202930 $1^{st}$ Response to Office Action dated Mar. 26, 2012 filed on Apr. 23, 2012, 4 pages. Australian Application No. 2011202930 $2^{nd}$ Office Action dated May 4, 2012, 3 pages. Australian Application No. 2011202930 $2^{nd}$ Response Office Action dated May 4, 2012 filed on May 10, 2012, 6 pages. Australian Application No. 2011202930 3rd Office Action dated Aug. 9, 2012, 4 pages. Australian Application No. 2011202930 3rd Response Office Action dated Aug. 9, 2012 filed on Oct. 10, 2012, 23 pages. Australian Application No. 2011202930 4th Office Action dated Nov. 2, 2012, 5 pages. (Australian Application No. 2011202930 4th Response Office Action previously cited). International Preliminary Report on Patentability, PCT/US2004/029776, International Filing Date Sep. 10, 2004, and Written Opinion of the International Searching Authority, 11 pages.

\* cited by examiner $h(x) = SHA256(x)$ $h'(A_t(c), salt, pepper)$
$E_{h''}(Winpwd)$

SYSTEM AND METHOD PROVIDING DISCONNECTED AUTHENTICATION

CROSS REFERENCE TO RELATED APPLICATIONS

This application claims the benefit of U.S. Provisional Patent Application No. 60/502,546 filed on Sep. 12, 2003, which is incorporated herein by reference.

STATEMENT REGARDING FEDERALLY SPONSORED RESEARCH

Not Applicable.

FIELD OF THE INVENTION

The present invention relates generally to cryptography and, more particularly, to systems for computer security.

BACKGROUND OF THE INVENTION

As is known in the art, there are a variety of systems for authenticating a user to a computer and/or computer network. For example, to log on to a computer, a user typically types in a password. However, as is well known in the art, a password-only system provides a limited level of security.

Other known authentication systems require two factors of identification. One such system is the RSA SECURID system by RSA Security Inc., of Bedford, Mass. In general, this system requires a user to input an alpha-numeric Personal Identification Number (PIN) and data from a device in form of an authentication token in possession of the user. A server verifies the user PIN and the security data from the token, which is known by the server. The RSA SECURID system is generally described in U.S. Pat. No. 4,720,860 to Weiss, which is incorporated herein by reference.

Authentication tokens, such as the RSA SECURID token, are becoming increasingly common for authenticating a user to a server over an insecure channel. The benefits of authentication tokens over the use of standard passwords are numerous, relating primarily to the reduced risks of impersonation attacks. Impersonation attacks refer to an unauthorized person attempting authentication to a secure server, and thereby access a corporate network, for example.

Typically, the authentication token shares some information with an authentication server, such as an RSA Security ACE server, where this information is typically not known to other entities, and where this information allows the generation and verification of at least parts of some authentication string. This authentication string commonly also includes, or is a function of, some information that is memorized by the owner of the token and also stored on the server. The authentication may be interactive, e.g., a challenge-response format, or non-interactive, e.g., no information is sent from the server to the user/token in order to complete the generation of the authentication string.

Currently, the information that constitutes the authentication attempt is sent over some potentially insecure communication link, such as a wireless or wired network. In one common scenario, the user in possession of the authentication token wishes to access some resource controlled by the server. The server can be assumed to be secure against attacks so that it can also be assumed that the secret information stored by the server cannot be compromised and used for purposes of impersonation of the user in question. The above-mentioned resource may be, for example, a database, an E-mail account, a storage unit, or processing ability. It can be assumed that this resource does not need to store any information useful for generating authentication strings, unless the resource coincides with the server performing the verification.

While such systems are effective for authentication of users in conjunction with a remote authentication server, the current system may not be effective when the authentication server is not available or impractical if the resource to which access is wanted is a computer that the token owner is in possession of. Under such circumstances, it would be beneficial if the computer could verify the authentication code without interaction with the remote authentication server. However, if the computer is lost or stolen, or otherwise controlled by an intruder, then this intruder could potentially obtain verification information and use this to attempt to impersonate the user (i.e., the token) to the remote authentication server. Thus, while some information may be stored on the computer in order to allow for authentication of token outputs, it should not introduce unacceptable security vulnerabilities.

It would, therefore, be desirable to overcome the aforesaid and other disadvantages.

SUMMARY OF THE INVENTION

The present invention provides a system for disconnected authentication. A server downloads a series of verification records to a computer, such as a laptop computer, that has been authenticated to the server. In one embodiment, the records correspond to a predetermined period of time. In another embodiment, the records correspond to events. The records are stored on the laptop and include information corresponding to data output, e.g., a passcode, by an authentication token for the predetermined period of time. The records are stored in a manner and format for minimizing the likelihood that an attacker can discover the token output for a given future time so as prevent authentication to the laptop and/or impersonation of the user upon reconnection to the server.

In general, a verifier authenticates a user who possesses an authentication token capable of providing one or more one-time passcodes. A verification record is obtained and a passcode is obtained. It is then determined whether the passocde is consistent with the verification record, where the verification record is a function of a reference passcode.

In one embodiment, the records include values that have been encrypted, obfuscated, or otherwise made unreadable using a one-way function. A hash function is one example of such a one-way function. In one particular embodiment, a hash algorithm receives as input a token output value for a given time, a so-called salt value, and a so-called pepper value. The resulting hash output, which is downloaded from the server, is stored on the laptop as part of a record. Records for each token output time interval over the predetermined period of time can be stored. The user is authenticated to the laptop if the token output is provided by the user and a hash of the token data, salt value, and pepper value matches the record corresponding to the give time interval.

BRIEF DESCRIPTION OF THE DRAWINGS

The invention will be more fully understood from the following detailed description taken in conjunction with the accompanying drawings, in which.

DETAILED DESCRIPTION OF THE INVENTION

The present invention provides a system that facilitates disconnected authentication at an agent, e.g., a laptop personal computer (PC), that is not able to communicate with an authentication server. When connected to the authentication server (prior to the period of disconnection), a series of verification records corresponding to a predetermined period of time are downloaded to the agent. In one embodiment, the agent stores processed, e.g., hashed, versions of one-time passcodes generated by the authentication server.

In general, a verifier authenticates a user who possesses an authentication token capable of providing one or more one-time passcodes. A verification record, which is a function of a reference passcode, is obtained. It is determined whether a submitted passcode, which can be generated as a function of time, event, challenge, etc., is consistent with the verification record, as described below in detail. In one embodiment, a disconnected user submits a passcode from the authentication token to the verifier for authentication of the user by determining whether the submitted passocode is consistent with the corresponding verification record.

In one particular embodiment, time-based passcodes are generated based upon a seed value of the user's time or sequence-based authentication token, such as a RSA SECURID token by RSA Security Inc. The verification records may be downloaded before the user takes a trip, for example. Alternatively, they may be downloaded for the duration of one login session, e.g., for a few minutes to a few hours. Each verification record is thus a function of a reference passcode, which can be generated from a seed value.

For time-based tokens the one-time passcodes are only valid for a short duration, e.g., one minute. A record for each token time interval should be downloaded. Alternatively, downloaded information, such as (possibly intermediate) seed values, should be downloaded so as to enable the records to be generated by the verifier itself, where the seed values should be deleted after the records are generated. This is more appropriate for a scheme involving hierarchical seed derivation as described in FIG. 2 below, since the intermediate seed values have limited lifetimes, than for a scheme with a single master seed and no intermediate seed values. The duration of the token output is independent of any changes to perceived time on the agent and time is controlled by the token. During the disconnection period, the agent can hash the passcode information entered by the user and compare the stored hashed passcodes to determine the presence of a match and thereby authenticate the user. That is, it is determined whether a passcode submitted for authentication is consistent with a given verification record, where the verification record is a function of a reference passcode, which can be generated by an authentication server, for example.

Figure 1:
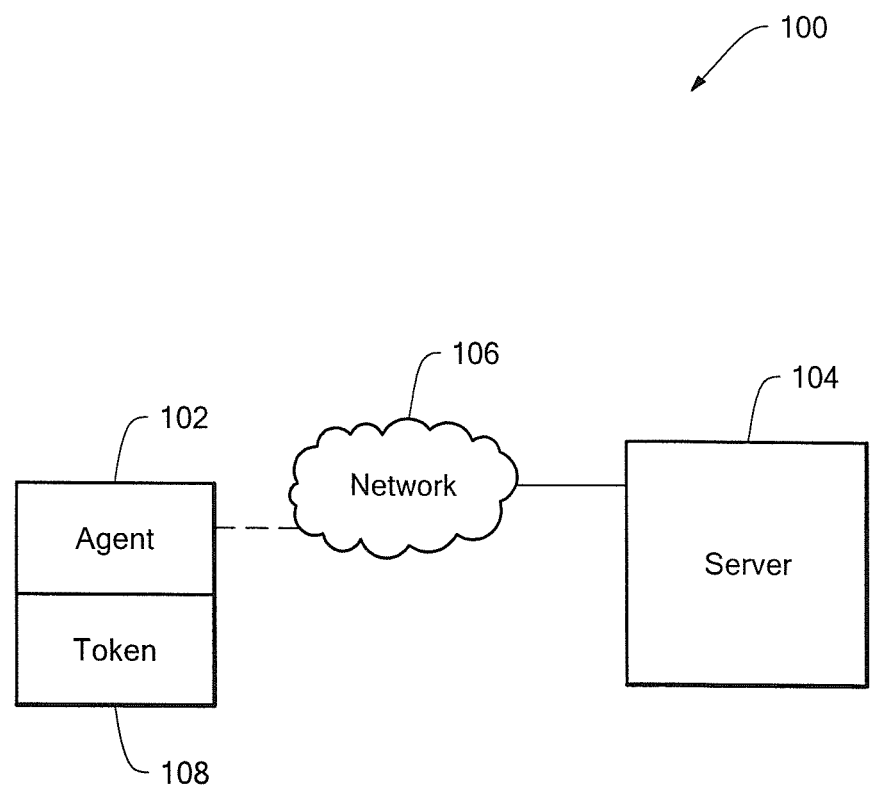
FIG. 1 is a block diagram of a system providing disconnected authentication in accordance with the present invention.

FIG. 1 shows an exemplary system 100 having disconnected authentication in accordance with the present invention. An agent 102, such as a personal computer (PC) as the verifier, can communicate with a server 104 via an optional network 106 for authentication by the server. A user can provide a personal identification number (PIN) and data from an authentication token 108 to the agent 102, which communicates this information to the server 104. In general, the token 108 is in the possession of the user controlling the agent 102. Information from the token 108 can be provided to the agent by the user, such as via keyboard, or can be provided automatically by wired or wireless communication link, for example. Information to the token may likewise be provided in various ways if needed. The token may also be a "virtual" software token that is implemented within the verifier. It is understood that the server may verify the token output against records of several time intervals (and/or corresponding to multiple events) so that clock drift or other loss of synchronization does not disable the user's access to the server.

After authentication of the user, the server 104 can provide information to the agent 102 that facilitates authentication of the user for a limited period of time, as described more fully below. With this arrangement, access to the agent 102 by unauthorized individuals and/or successful impersonation of the authorized user to the server 104 upon reconnection can be rendered unlikely.

A variety of token types can be supported, including time-based tokens, where the token output or token code is a function of a time variable and a token secret (e.g., seed value); challenge-response tokens, where the token output or response is a function of a challenge value provided to the token and a token secret; event-based tokens, where the token output is a function of an event counter and a token secret, or where the token output is a function of the token secret, and the secret is updated in response to some event (e.g., pressing a button on the token); and tokens involving some combination of the above. Token state information may also be incorporated into the process of deriving the token output, as further described in M. Jakobsson and A. Juels, "Identity Authentication System and Methods," U.S. patent application Ser. No. 10/724,034, filed Nov. 26, 2003, which is incorporated herein by reference. Moreover, the one-time passcodes need not be generated by any particular function; they may be random values stored in the token and shared with the authentication server. Also, the token need not be a computing device per se; it could comprise instead of a card (perhaps of the "scratch-off" variety) on which the passcodes are printed. It is understood that the terms passcode and authentication string are used interchangeably.

In addition, a PIN may be appended to the token output or otherwise included in the process of computing a one-time passcode. This combination may be done by the token itself, or elsewhere. Alternatively, the PIN may be provided to the token and verified locally by the token before the token produces an output. Biometrics may also be employed to authenticate locally to the token. However, a PIN or a biometric is not required for the methods described herein.

Figure 2:
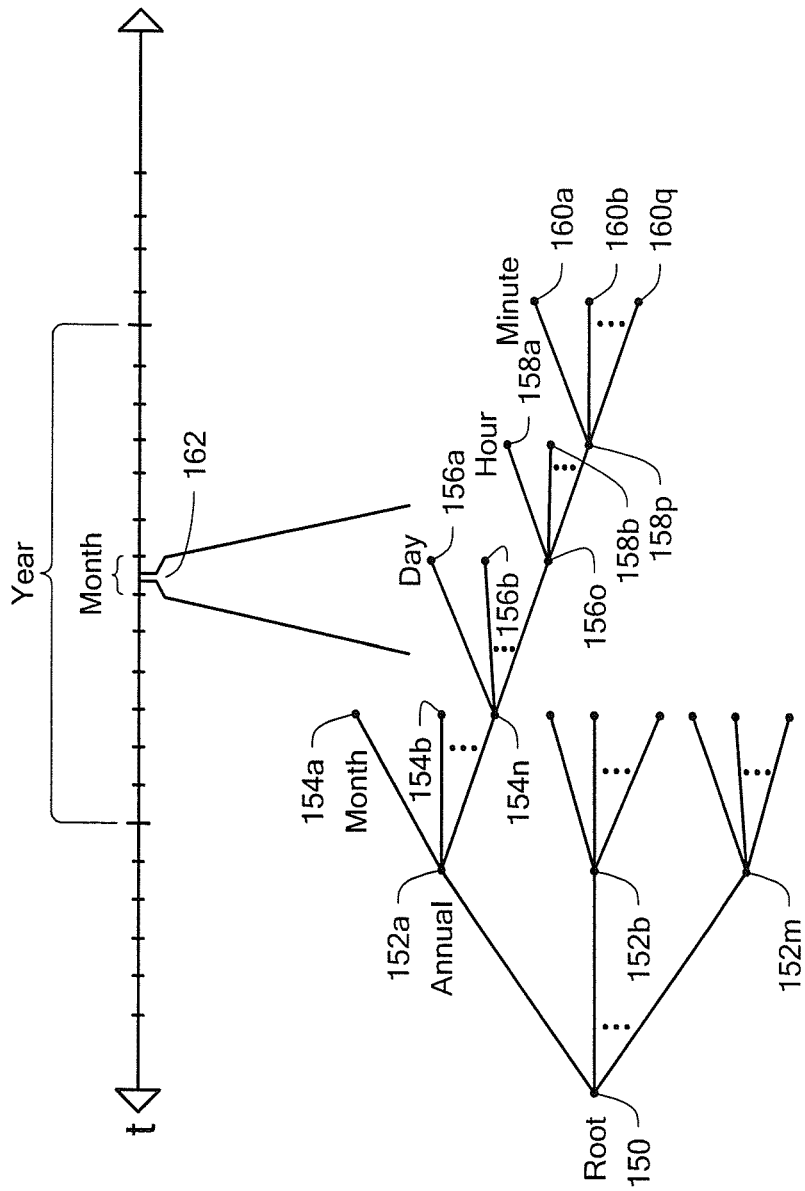
FIG. 2 is a pictorial representation showing exemplary time-based information that can be downloaded to provide disconnected authentication in accordance with the present invention.

FIG. 2, in combination with FIG. 1, depict information that can be downloaded for disconnected authentication in accordance with the present invention. In one particular embodiment, the authentication token 108 includes a root seed 150 that generates annual seeds 152a-m, from which monthly seeds 154*a-n* are generated. Daily seeds 156*a-o* are generated from the monthly seeds 154, then daily seeds 158*a-p*, hourly seeds 158*a-p* and so on until a unique value is generated at the desired time interval, such as every sixty seconds (one minute) 160*a-q*. The seed values can be generated using a one-way function in a manner well known in the art. The authentication server 104 can also generate these values so as to be able to verify the token value. In addition, these values are used to generate the records to be downloaded to the agent.

If the user is aware that there will be a disconnection from the server 104, authentication information in the form of records can be downloaded by the server to the agent 102 covering a predetermined amount of time, such as three days 162. The records can each correspond to a given time interval for the token. The downloaded information should enable a user to access the computer (agent 102) for the three days 162 until re-authentication with the server 104. The downloaded records should be stored so as to render it quite difficult for an unauthorized person, such as an individual who has stolen the laptop computer, to access the computer and/or impersonate the user to the authentication server. It will be appreciated that in many cases attackers desire to impersonate a user to gain access to a corporate network, for example.

It is understood that the invention is applicable to embodiments in which a password or personal identification number (PIN) is provided along with information from authentication tokens, as well as challenge/response embodiments.

The downloaded information can be downloaded using a variety of automatic and manual mechanisms. However, the authentication server should verify that the user is authorized to download the information. In general, the downloaded information is stored as records on the agent such that the agent can identify the time interval to which each record is associated.

In an exemplary embodiment, the downloaded records correspond to a predetermined period of time. For example, an authorized user may have a three-day period of disconnection from the server. The server can download records for authentication during the three-day period. The records can include information corresponding to challenge/response data. In one embodiment, the records include encrypted data corresponding to a response $A_t(c)$ of an authentication token at time t in response to a challenge c, which would form a part of the record. However, a challenge is not required. As described further below, a time-based value alone may also be employed. More generally, the invention is applicable to the variety of authentication token types mentioned above.

It is understood that a time-based (and in some places also challenge-based) authentication token is assumed, but the techniques described herein are readily adapted to event-based and other non-time based embodiments. For instance, instead of associating a token output with a time variable, the output can be associated with a counter; records accordingly may not correspond directly to a period of time (e.g., three days), but rather to a number of token outputs (e.g., 300 token outputs). For convenience, the time-based embodiment is generally described below, but the conversion to an event-based or sequence-based embodiment, and the incorporation of a challenge will be readily apparent to one of ordinary skill in the art. The notation $A_t(c)$ is intended to represent this variety of alternatives.

While the description below primarily refers to the use of a hash function, it is understood that a variety of algorithm types, including one-way algorithms and non one-way algorithms are well within the scope of the present invention. As used herein, a one-way function refers to a one-way function for which it is substantially more difficult to invert than to compute. A standard hash function such as SHA256 (defined in Federal Information Processing Standard (FIPS) PUB 186-2, "Secure Hash Standard (SHS)", August 2002), may be employed. Alternatively, as is well understood, it may be beneficial to employ an iterated hash construction, e.g., 1000 successive iterations of SHA256, to increase the computational cost to an attacker while maintaining a modest overhead for the user. Further, while the invention is generally described in conjunction with providing a time-based variable, e.g., token output, to a one-way function, it is understood that variables can also correspond to events and the like.

In one particular embodiment, the downloaded records include a hash of $A_t(c)$ along with a salt value and a pepper value for each time interval of the token over the predetermined period of time, e.g., three days. The salt value is stored with the associated record and the pepper value is not stored. The salt values are likely different for different times. Alternatively, information, such as one or more seed values, can be downloaded for enabling the records to be generated.

As used herein, a salt value refers to a value that is included as part of the information that is hashed (or otherwise encrypted). The salt value can be provided, for example, as a random number having a predetermined number of bits. The salt value may be stored along with the record, or to reduce the storage requirements, it may be generated from a master salt value associated with a set of records, and other information associated with the given record. As is understood by one of ordinary skill in the art, salt values frustrate a dictionary type of attack to obtain a security value, such as the token output. Since the salt values are different for different times, the work required by an attacker to determine a security value must be performed for each time interval since the salt is part of the hashed data.

As used herein, pepper refers to a value having a known or predictable number of bits that is part of the data that is hashed. However, unlike a salt value, the pepper value is not stored. Also, the pepper value is not downloaded. Thus, possible pepper values are computed and the hash function evaluated for each pepper value. Pepper slows down a dictionary-type attack since the hash function must be computed for possible pepper values to identify the actual value.

Figure 3:
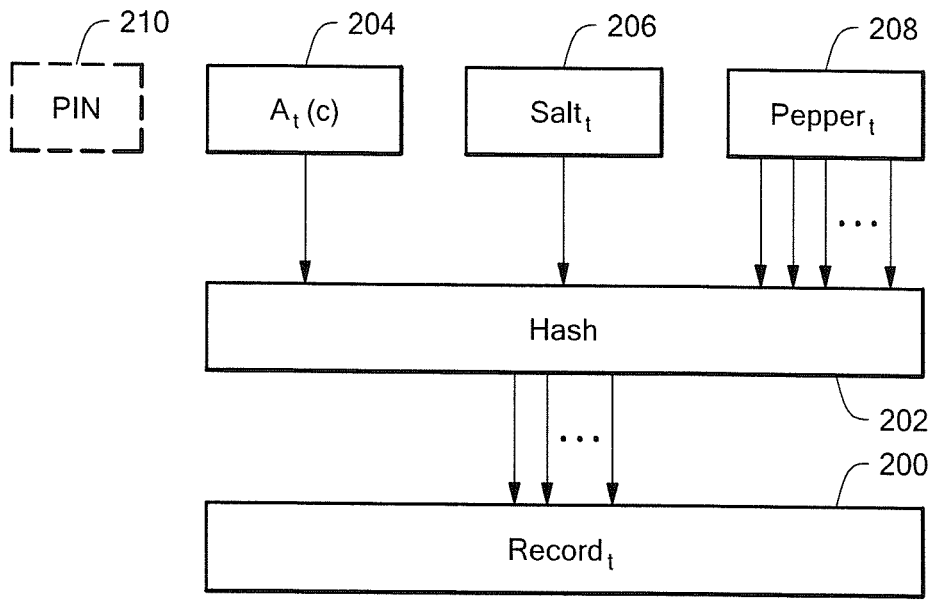
FIG. 3 is a block diagram showing exemplary components of disconnected authentication in accordance with the present invention.

In one particular embodiment shown in FIG. 3, a given record 200 corresponding to time t includes information corresponding to a hash function output 202. Inputs to the hash function include a token output for time t, $A_t(c)$ 204, a salt value 206 for time t, and a pepper value 208 for time t. When attempting to gain access to the computer, the user may be asked to provide the token output $A_t(c)$ 204. It is understood that since the pepper value 208 is not stored, the hash function is evaluated at possible pepper values. While the number of bits for each of these values can vary, exemplary bit numbers include 20 bits for $A_t(c)$, 10 bits of pepper, and 21 bits for salt. The resulting hash function 202 evaluations are compared to the stored record 200 for the given time to identify the correct value and gain access to the computer.

It is understood that if there is no challenge, then c is not stored. In ddition, where there is not a challenge, $A_t$ is not a function of c, and the user is not required to enter c into the token (or, if the token has a wired or wireless communications link, the token is not required to receive the challenge c). It is understood the invention is applicable to challenge and non-challenge embodiments.

To compute the hash function outputs not knowing the token security data $A_t(c)$ 204 for a given time and not knowing the pepper value 208 requires calculations on the order of $2^{20} \times 2^{10} = 2^{30}$, for 20 bits of $A_i$ and 10 bits of pepper. As noted above, the salt value 206 is known but prevents a parallel-type of attack on all records.

In a further embodiment, a personal identification number (PIN) value 210 (shown in phantom in FIG. 3) can form a part of the data to be hashed. If the PIN data is 13 bits, then an attacker has work on the order of $2^{30} \times 2^{13} = 2^{43}$ computations for each time interval. And as described more fully below, the operations must be performed prior to expiration of the period of time for which records have been downloaded.

Figure 4:
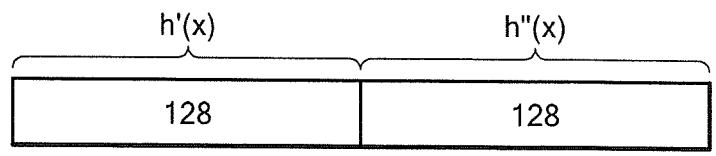
FIG. 4 is a textual representation of an exemplary record that can form a part of disconnected authentication in accordance with the present invention.

In one particular embodiment shown in FIG. 4, a public 256-bit hash function known as SHA256 is used. The 256-bit output from the SHA256 hash function is computed from the inputs of the security information from the authentication token (i.e., the token output or passcode), the salt, and the possible peppers. A portion of the SHA256 hash function output can be compared to the stored record. In an exemplary embodiment, the most significant 128 bits of the SHA256 output can be defined as h'(x) for comparison to the stored record. If the inputs are correct, h'(x) for one of the hash results (from the results for possible pepper values) will match.

The least significant 128 bits (h"(x)) of the SHA256 hash function output for the correct pepper value are used as a key to decrypt an encrypted value of a Windows password. With this arrangement, the correct Windows password can be extracted only upon entry of the correct security information from the authentication token.

EXAMPLE

Time is partitioned into intervals equaling the duration one token output is displayed. One record is associated with each such time period. The i-th time period after some (arbitrary) baseline time is referred to as time i, and the record associated with this time period is called rec_i. Such records are computed by a machine, such as an ACE server, with knowledge of the token seed. A batch of records is then downloaded from this machine to a machine, which can be referred to as a verifier, that will later perform off-line verification of token outputs. The verifier is typically a laptop.

The initialization process (performed by the authentication server each time a batch of records is to be downloaded) is as follows. A random salt value salt_i with a fixed length between 40 and 80 bits, for example, is selected. A random value pepper_i with a fixed length between 10 and 25 bits is selected. The token, e.g., RSA SECURID, output is computed for time interval i, with the correct PIN appended or otherwise combined. Let this be the value val_i, which is 34 bits long for a 6-digit token and a 4-digit PIN. It is possible to let val_i be only the token output, in which case the PIN will not be verified via the hash records. The value y=SHA256 (pepper_i, salt_i, val_i) is computed. Let A_i be a first portion of y, where A_i is of fixed size between 80 and 128 bits, for example. Let B_i be a second portion of y, which may be 128 bits (but not contain any part of A_i). The value A_i is later to be used to verify the correctness of an authentication attempt, while B_i provides a key that may encrypt a Windows password, a secret key, or any other secret information that is beneficial to employ on the verifier. This piece of information, also called data element, is referred to as M, and the encryption of M using B_i as E_i. One can use the well-known AES algorithm for the encryption of M. If M is longer than 128 bits, then the cipher would be used in cipher block chaining (CBC) mode. Let rec_i=(salt_i, A_i, E_i). Note that the quantities pepper_i, val_i and B_i are not included in the record and are not sent to the verifier.

It is understood that the piece of information M can take a variety of forms. In addition to a key for decrypting the Windows password as already mentioned, the piece of information can be:

- A secret key for a symmetric-key cryptosystem such as the Advanced Encryption Standard (AES) for decrypting files or other data on the verifier
- A secret key for authenticating data with a Message Authentication Code (MAC)
- A private key in an asymmetric (public-key) cryptosystem such as the RSA public-key cryptosystem, for decrypting files or other data
- A private key for authenticating data with a digital signature scheme
- A secret key or private key for authenticating to an application, e.g., on another computer
- A secret key or private key for unwrapping other keys (which could themselves be secret keys or private keys as described above)
- A key for protecting sensitive data, such as user profile information (e.g., a credit card number), or a local password table
- Any sensitive data
- The Windows password itself In addition, instead of encrypting M with the value B_i, a key could be derived directly from B_i. Alternatively, the value B_i itself could be employed as a key.

The authentication process is as follows. The user enters a username (optional), the current token code, and PIN (optional), and from these a value val_i is obtained. The verifier selects the record rec_i to match the input to based on user name (if input) and time. Using exhaustive search (in any desired order) over all possible values of pepper_i, values y=SHA256 (pepper_i, salt_i, val_i) are computed. The first portion (of the same size as A_i) is compared to the value A_i in rec_i to determine if there is a match. If there is a match for some pepper, then authentication succeeds. In that case, let B_i be the second portion of y. The value B_i can be used to decrypt E_i to obtain M.

As is well understood for one-time passcodes, there may be some loss of synchronization between the token and the verifier. See U.S. Pat. No. 4,885,778 to Weiss, for example, which is incorporated herein by reference. Accordingly, if authentication with record rec_i does not succeed, the verifier may try again with one or more adjacent records. It may also keep track of which records have been employed in previous successfully authentications in order to prevent reuse of previous token codes.

Alternatively, instead of computing an A_i value, the verifier could compute only the B_i value, and authenticate the user based on the successful decryption of E_i alone. For instance, if the encryption operation includes redundancy such as padding or a checksum that is checked during decryption, or if the value M encrypted itself has redundancy that can be verified, then successful decryption provides assurance that the correct key B_i has been employed. This in turn provides assurance that the security information provided was correct. This approach has the benefit of reduced storage and computational requirements since the A_i value is not computed or stored.

As another alternative, the successful use of the value M could be a means by which the security information is verified. For instance, if the value M is the Windows password (or a key by which the password is decrypted), then the Windows password could be verified by the Windows operating system as a means of determining whether the security information is correct. In addition to increasing assurance of correctness, this approach also has the benefit in the case that values are encrypted without redundancy that the values must be used in order to be verified, thereby potentially signaling attacks to the systems in which the values are used. That is, an attacker who obtains the records may not be able to determine whether a guess for the security information is correct without using the value M.

Elements of the various alternatives mentioned can also be combined, so that the assurance of correctness comes from the match of A_i, the successful decryption of E_i, and/or the successful use of M.

Figure 5:
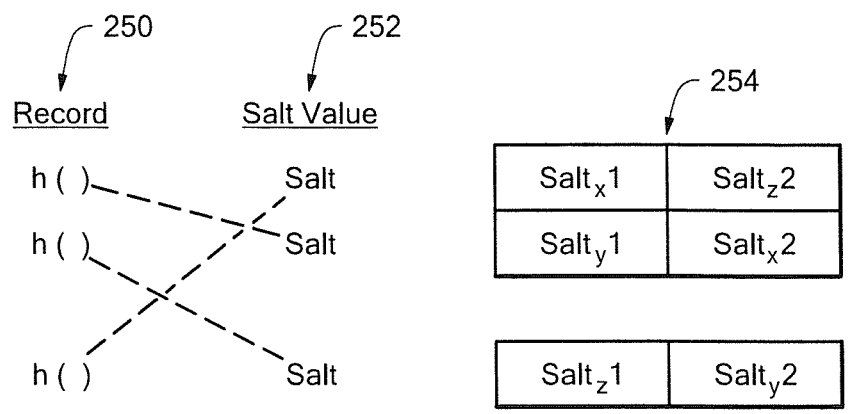
FIG. 5 is a pictorial representation of a further feature of disconnected authentication in accordance with the present invention.

In another aspect of the invention shown in FIG. 5, the salt value for the hash function can be 'shaken'. In one embodiment, the association between each hash record, as shown in a first column 250 and the corresponding salt value in column 252 is stored in a permuted manner. That is, the salt value stored with a hash output is not the salt value for that hash output. With this arrangement, salt values are tested to identify the salt value corresponding to a given hash output. It is understood that a wide variety of mechanisms known to one of ordinary skill in the art can be used to permute the salt/hash associations.

In a further embodiment also shown in FIG. 5, the salt values are split into first salt1 and second portions salt2 that are stored separately, as shown in column 254. The first and second salt portions are separated, permuted, and stored. It will be readily apparent to one of ordinary skill in the art that the salt can be split into any number of portions and permuted in a variety of techniques and manners. It will further be readily apparent that there are large number of mixtures of salt and pepper that can be used.

EXAMPLE

As part of the 'salt shaker' initialization process, some number n, e.g., 1000, of records are prepared at the same time. Pepper is set to the empty string (i.e., no pepper is used). For each record, this results in a tuple (salt_i, val_i, A_i, B_i, E_i). Among these, the verifier receives all but B_i. However, before any values are sent over, the n salt_i values are randomly permuted. Their bitstrings are not modified, but only the records they are associated with. After the permutations, there are n records of the format rec_i=(salt_i, A_i, E_i), where salt_i now is used to mean the salt permuted to the i-th position. The values A_i or E_i are not permuted.

In the verification process, the verifier exhaustively tries every combination of salt_i value and A_i value. It computes the value y=SHA256 (salt_i, val_i) for each such salt value, comparing the first portion to the A_i value of the selected record. This process "delays" the computation of the correct value y by a factor n/2 on average, and n as a worst case. This would therefore correspond to a pepper-value of length 10 bits. It is straightforward to create longer delays without having to process more records.

To increase the computational cost by an average factor of n*n/2, one breaks up the salt values in two portions of the same size and each such portion is then associated with a random record, i.e., the halves are independently permuted. A record then has the format (salt_{i1}, salt_{i2}, A_i, E_i), where salt_{i1} is a permuted first half, and salt_{i2} is a permuted second half. To verify a token value, the verifier needs to exhaustively search through all combinations of first-half and second-half salt values, which takes on average n*n/2 tries. One can readily increase the computational work by breaking each salt up into even smaller portions, and also by not storing them in the order of first half first, etc., but in a random order for each record. Another way of increasing the work is to introduce "dummy" records that must also be searched.

Figure 6:
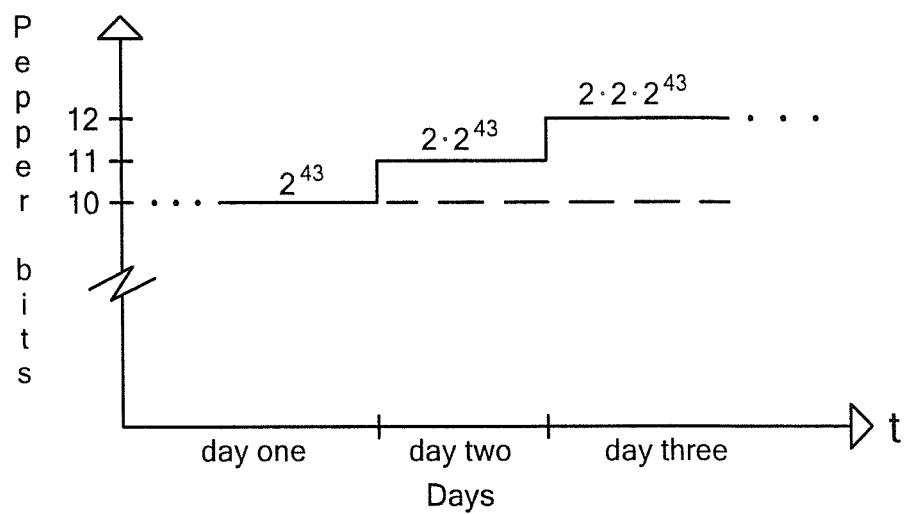
FIG. 6 is a graphical representation of an additional feature of disconnected authentication in accordance with the present invention.

FIG. 6 shows another aspect of invention in which the passage of time increases the work required for an attacker to successfully access the computer. In one particular embodiment, a user downloads authentication records for three days, for example. As described above, the work required for a successful attack requires $2^{43}$ computations. If the user does not login for a predetermined period of time, such as one day, the amount of work increases to $2 \times 2^{43}$ for a successful attack the next day, for example. If the user does not login for two days, then the work then increases to $4 \times 2^{43}$. While the additional work also incrementally increases the time required to authenticate a user that has provided correct security information, the work required for an attacker doubles for each subsequent time period, e.g., day. The delay for a user to login may be noticeable but should be acceptable.

In general, the effort of the computer should be about the same as without the inventive techniques described herein (and relatively low) when the real user authenticates. It is acceptable that the computational cost goes up if the user has not authenticated for a relatively long period of time. However, the system should not allow an attacker a lot of time to "break up" a record by trying all possible combinations. Therefore, records that correspond to future time intervals should be more protected than those corresponding to current time intervals since the attacker will have more time to attack those.

It will be appreciated that an attacker attempting to gain unauthorized access to the computer will be motivated to obtain entry with the lowest amount of work required. Thus, an attacker may not be inclined to select a time interval for which the token output would not be recovered until near the end of the predetermined period of time, e.g., three days, corresponding to the downloaded records. The attacker has a limited time period in which an attack may be feasible due to the amount of work required.

Still referring to FIG. 6, in one embodiment each successful login provides access to a "hint" for the next login or time period. In an exemplary embodiment, the number of bits for the pepper value increases for each day that the user does not login. For example, on day one the pepper value is 10 bits, which corresponds to a work in the amount of 243 computations, as described above. If the user does not login during day one, the pepper value increases to 11 bits for day two. If the user does login on day one, one bit of the day two 11-bit pepper is obtained for use on day two so as to provide an effective pepper value of 10 bits for day two.

If the user does not login during day one or day two, the pepper value for day three increases to 12 bits, which corresponds to work of $2 \times 2 \times 2^{43}$. If the user does attempt to login on day two without a login during day one or day two, the delay in obtaining access may increase due to the increased number of calculations corresponding to the increased number of pepper values. However, the increased delay should not be prohibitive.

It is understood that while providing hints is described as obtaining pepper bits the manner of providing hints can vary in number of bits, time, last login date, value type, etc. in ways that will be readily apparent to one of ordinary skill in the art in view of description contained herein. In the following, hints are treated as variables separate from pepper, although they may also be implemented as a portion or other property of pepper.

In another embodiment, hints are provided from selected portions of the space of pepper values or permutations of shaken salt values. For example, unequal portions of the pepper space can be selected with random bits having unequal probabilities of being a logical "1" or "0".

EXAMPLE

A record rec_i=(A_i, Δ_i, salt_i) for time interval i. Time is also partitioned into longer time periods, such as 24-hour intervals or calendar days, indexed by t. Each time period t is associated with a value hint_t, which may be in the range of 1-10 bits long, for example. The longer time period to which time interval i belongs is denoted t_i; several successive time intervals will belong to the same longer time period (e.g., 1440 time intervals, if a time interval is one minute and a longer time period is one day).

When receiving an input value val_i, it is desired to verify whether it corresponds to rec_i. Assume here that val_i is part of longer time period t_i, and that hint_{t_i−1} is known. The hint would be known if the user successfully authenticated to the server during the previous longer time period. The verifier computes the quantity (A|B)=h (val_i, hint_{t_i−1}, salt_i, pepper_i), for all possible values of pepper_i, where h ( ) indicates a hash function, where A is of the same size as A_i, salt_i refers to the salt value for interval i, pepper_i refers to possible pepper values at interval i, and B refers to a portion of the hash output that can be used as a decryption key. The quantity A is compared to the value A_i, and if matching, then (val_i, pepper_i) is considered to correspond to the record rec_i for the time interval.

It is understood that the value B can be used to encrypt both the Windows password or other data and the next hint. Information sufficient to decrypt each could be stored as the field E_i in the record. Alternatively, a delta value Δ is stored such that when XOR'd with some portion of B the result generates a hint for some future time interval. The value Δ can be computed by the authentication server and downloaded to the computer at some previous time.

If the value hint_{t_{i−1}} is not known, all possible values would have to be exhaustively tried. This holds both for the "honest" use of the system, and for an attack in which the attacker wishes to determine the quantity val_i given the state of the corrupted machine.

The hints are computed from value B. In particular, hint_{t_i}=Δ_i XOR B' where B' is a bit of B (or a bit otherwise obtained via B). Thus, the party computing rec_i sets Δ_i=B XOR hint_{t_i}, where hint_i is chosen independently of the values in rec_i and XOR refers to the logical exclusive-or function. This allows a "discounted" computation of (A|B) during the next longer time period by a party who knows hint_{t_i−1} compared to a party who does not know the hint. The latter party would have to try all possible hints in combination with all possible peppers; the former would only need to try all possible peppers, having maintained the hint from a previous successful authentication. Thus, peppers slow everyone down, hints only slow those down who do not know them.

In the above, one needs to know the hint revealed in the immediately previous longer time period in order to get the computational discount associated with the hints. (Alternatively, but without the discount, one could solve for the hint in the present time period, as it would be the same for other records in the same time period.) In one embodiment, it is desired to give parties with knowledge of hints received in yet earlier time periods similar benefits.

If the size of a hint is 10 bits, a 10-bit discount can be given to a party who knows the hint value of the immediately previous longer time period. A nine-bit discount can be given to a party who knows a hint two longer time periods old, a eight-bit discount to a party who knows a hint that is three longer time periods old, etc. This can be achieved by letting hint_t=f(hint_{t−1},r_t), where r_t is a random bit (or several bits in case the difference in helpfulness between consecutive hints should be greater than one). Here, f could be chosen as an LFSR (Linear Feedback Shift Register), a one-way function, or other mechanism that appropriately combines the input portions.

The above description corresponds to a setting in which the computational effort grows exponentially with the number of time periods since the last known hint.

Alternatively, and as described below, the computational effort can be made to grow linearly with the number of time periods. During a setup phase, the system generates a random encryption key K_t for each longer time period t for which records are to be stored on the verifier. The system defines Δ_i so that B_i' XOR Δ_i reveals the random encryption key. The key K_t is recovered after a successful authentication. Using the daily encryption key K_t, a relatively small table of bit strings M_1, M_2, ... M_T is encrypted, where M_j is a "mask" for the j-th following time period, and T is the number of time periods ahead that a successful authentication results in "discounts." Each value M_j is a T-bit string in which each bit corresponds to a different portion of the space of possible pepper values in which the pepper may occur on the j-th following time period; the value M_j will have j bits set. That means that the more recent M value that is known (given a previous and successful authentication attempt), the more the search space of possible pepper values is reduced, which in turn speeds up the computation correspondingly.

Later, for a successful authentication attempt, the strings M_1 ... M_T are derived and stored in plaintext by the verifier. This allows a reduction in the computational cost of future authentication attempts. If a bit of M_j is set, then the pepper should be searched from that portion of the space, if clear, then it's not. M_j will have j bits set, which means the pepper space is reduced to 1/T of its full size of the next long time period, 2/T for the following long time period, 3/T for the next one, etc. The M_j values revealed during successive long time periods, and which correspond to a given future time period, should have one more bit clear than what was revealed during the previous time period, so that M_j values revealed during different long time periods do not give away an undesired amount of information.

In one embodiment, new "long periods" of records are downloaded to the verifier on a regular basis upon authentication with the server. The masks should work for the new long time periods, which means the server has to keep track of the masks. The verifier's first download (which will require an initial authentication) can comprise of an initial set of masks.

The above-described technique also works for the so-called salt shaker embodiment; a hint would be input to the hash function along with the permuted salt value, and the next hint would be encrypted in the record. In one alternative embodiment, hint values in the context of the salt shaker embodiment erase the salt portions that correspond to a previous successful authentication attempt, or otherwise marks these portions as searched. Then, this record, and the associated salt, are not searched for future authentication attempts, thereby providing a certain computational discount for each successful authentication attempt. It can be seen that the more successful authentication attempts there are for a certain bounded time period (associated with the set of records that are permuted), the lower the computational cost would be.

EXAMPLE

Time is apportioned into days, e.g., 24-hour periods. For example, if a user successfully authenticates to the verifier during a first 24-hour period, it should be less 'expensive' to verify token outputs for the period starting 24 hours afterwards; much less expensive for the next 24-hour period, and significantly less expensive for the same 24-hour period.

Pepper values are selected from a range [0 . . . maxpepper], where maxpepper equals 4095, for example. This range can be divided into four portions, [0 . . . 1023], [1024 . . . 0.2047], [2048 . . . 3071], [3072 . . . 4095]. All pepper values of a given day are selected within the same one of these four ranges. Once a user has successfully authenticated to the verifier, the verifier knows what portion this is so that any further attempts within the same day will cost only ¼ of what they normally do, in computational effort. This is due to the fact that it is known that the pepper of later that day is from the same range as from earlier in the day, and the verifier recalls the range. This will not give a discount for the next day. However, if the value M contains information about two intervals (out of the four) that are not used for peppers for the next day, that allows all authentication attempts of the next day to be performed at half the cost of what they would otherwise be.

Furthermore, if the value M contains information about one pepper interval that is not used for the day after next, then this would give a ¼ computational discount for the day after next. Note that the two-day hint would have to be a subset of the next-day hint in order for the two hints not to reduce the cost to ¼, unless this is the desired behavior.

An advantage of the various pepper and salt shaker approaches above is that the cost to an attacker is substantially increased with only a modest impact on the cost of generating the records. This is attractive if a large number of records are required to be generated at an authentication server, which can be the case if there are many users, particularly for time-based authentication tokens where new token outputs are generated frequently (e.g., every minute). However, the pepper and salt shaker approaches are not required. An alternative approach is to employ an iterated or otherwise slowed hash function. This also substantially increases the cost to an attacker, though it can have a larger impact on generation (since the party generating the records must also employ the slower hash function, as opposed to just selecting a pepper or a salt permutation).

Another alternative to the pepper or salt shaker approaches is to employ a time-lock puzzle such as described in R. L. Rivest, A. Shamir, and D. A. Wagner, "Time-Lock Puzzles and Timed-Release Crypto", technical memo MIT/LCS/TR-684, MIT Laboratory for Computer Science, February 1996. A time-lock puzzle is one that can be constructed efficiently, but whose solution takes a large number of operations. As an example, the puzzle may require the calculation of a value $y = x^{(2^k)} \mod n$ where n is a large composite modulus and x and k are given integers. The party constructing the puzzle also knows the factors of n and hence phi(n), where phi(n) is Euler's totient function. This party can therefore compute y efficiently as $y = x^r \mod n$, where $r = 2^k \mod phi(n)$. However, the party solving the puzzle only knows the modulus n and does not know phi(n), so must perform k successive modular squarings. For the purposes here, the input x would take the place of the input to the hash function; the value k would be a variable integer controlling the cost; and the output y would take the place of the output of the hash function.

A time-lock puzzle has the same characteristic as the pepper or salt shaker, namely that the cost of verification is increased without a significant increase in the cost of generation. However, in the pepper and salt shaker approaches, there remains a possibility that an attacker, by chance, may guess the pepper or the salt permutation correctly in fewer operations than expected. In the time-lock puzzle approach, like the iterated-hash approach, an attacker must essentially perform all the steps required; there are no unknowns to guess, just work to be done. (Nevertheless, such "unknowns" can readily be accommodated if needed, for instance as additional parts of the input to the hash or puzzle; this would provide a way to incorporate hints into these approaches.)

In a further embodiment, a "long term" hint can be provided for access at a time past the predetermined interval for which records were downloaded. For example, if records for a 30-day time period were downloaded and the user did not login for the 30-day period, the user may need to contact the authentication server or a call center, such as via phone, to obtain a further passcode. This can be considered an emergency access code, which would be relatively long.

In an exemplary embodiment, downloaded records include records stored in a first format, such as described above, for a first period of time, e.g., the first 30 days, and in a second format for a second period of time, e.g., the next 30 days. In one embodiment, the records for the second 30 days are encrypted with an emergency access code in addition to the encryption described above. With this arrangement, upon obtaining the emergency access code, the user can authenticate during the second thirty day period. The emergency access code can be considered a hint to facilitate verification of a hash for a time interval in the second 30-day period. The emergency code can also be used to enable access to a hint.

In an alternative embodiment, a relatively long pepper value, e.g., 80 bits, can be input to the hash function. Of the 80 bits, the verifier may initially be given 60 of the pepper bits, which are the same for a predetermined period of time, such as a calendar month. The 60 bits for the next month are not known. The 60 bits for the next month can be obtained, for example, via authentication to the server or via oral telephone communication, which can be provided by a call center.

It is understood that either all records may be encrypted together, which would include the user of a relatively long emergency key, such as 128 bits, or individual record can use an "extended pepper value" where the extension is the emergency key, and is the same for all the records of the 30-day period. Once the emergency code is revealed and stored along with the records, the pepper search is as straightforward as it would have been if there never were any extension of pepper values.

As a further variation, the user could be required to employ more than one token output in some cases in order to authenticate. The techniques already described are readily modified to accommodate this case, by deriving the value val_i from two (or more) token outputs (typically consecutive), and optionally a PIN. As an example, the verifier might be provided an ordinary set of records (derived from a single token output) for a first time period of 30 days, and a modified set of records (requiring two token outputs) for the next 30 days. In this way, a user who has been disconnected for more than 30 days would still be able to authenticate, but only with two token outputs; this would greatly increase the cost to an attacker of searching for the correct token outputs for those next 30 days, giving appropriately stronger protection to future records stored on the verifier. Indeed, with such strong protection, one could potentially store a year or more of future records thereby supporting an indefinite period of disconnection. In many cases, however, administrative policy may require that the user authenticate to the server occasionally to verify that the user remains authorized to use the disconnected machine. Additional hints downloaded during these authentications could be incorporated into future records to enforce that policy.

The hinting mechanism described above may be applied beneficially here as well. The modified set of records could also contain an encrypted hint, so that when the user authenticates during the second period of 30 days with two token outputs, a hint is obtained that enables subsequent authentication with a single token output during those 30 days. One way to achieve this feature is to have two sets of records for the second 30 days: a modified set of records requiring two token outputs that also includes an encrypted hint; and an ordinary set of records requiring a single token output plus the hint. The increased cost to an attacker prior to the second 30-day period would still be maintained, since the attacker would need either to guess two correct token outputs, or one correct token output and the hint (which could be comparably long). However, once the user authenticates successfully during the second 30-day period with two token outputs, the hint for that time period would be revealed and the user could authenticate thereafter with a single token output.

A similar structure may be applied for multiple time periods, so that each time a user enters a new time period, two token outputs are required. As one case, the user could be required to enter two token outputs initially for the first time period. Hints from prior time periods could also be combined with this construction in a variety of ways, perhaps so that the requirement for two token outputs is superseded if the user has authenticated sufficiently recently with one token output, or sufficiently often.

The modified records employed in conjunction with the two token outputs need only produce the hint, and do not need to enable immediate authentication of the two token outputs; this is an example of the principle described above where the correctness of a token output may be determined by the use of the value M recovered from the record. The value M here would be the hint. After recovering a candidate hint from the two token outputs, the verifier would then use the hint to verify one or both of the token outputs against the ordinary records. This approach has the advantage that the modified records need not include the A_i values, but only the E_i values (and possibly a salt, if it is not derived from a master salt as also described above). It is clear that these E_i values for the modified records could simply be stored as another field of the ordinary records rather than having two separate sets of records.

In another aspect of the invention, only a portion of a user's PIN is employed in generating the records so as to increase the likelihood of failure of an impersonation attack and to provide an opportunity to detect an impersonation attack. As described above, there is a possibility that an attacker may obtain the security information for the authentication token for a given time. By using only a portion of the user PIN, an attacker may not be able to obtain the full value of the correct PIN from the records. Later, the attacker may attempt to impersonate the user to the authentication server. Since the attacker does not yet have the full value of the correct PIN, the authentication server may be able to detect the attack. It will be appreciated that storage of PIN information can be modified to balance security for the authentication server and security for the laptop computer.

For example, if the PIN is four digits only two digits may be used. An attacker may obtain the two digits in the record, however, the other two digits remain unknown and would have to be guessed by an attacker. In one embodiment, the attacker must guess the correct PIN to obtain the Windows password, e.g., the password is itself combined with at least part of the PIN. This makes it more difficult for an attacker to obtain the Windows password.

The security threat is that an attacker may learn the PIN after successful a search and then use the PIN to authenticate to the secure server. By using only a portion of the PIN on the disconnected machine, the attacker is not able to obtain the entire PIN. It is understood that the user may still enter the full PIN each time to create the same user experience but parts of the PIN can be ignored before use in computations.

While certain embodiments describe herein refer to a Windows password, it is understood that the invention is applicable to other operating systems in which a user is requested to provide identifying information during a login procedure.

In another embodiment, multiple records for the same time interval can be stored. Each record can correspond to a correct token output but only one record has the correct PIN. For example, there can be a number of records, three for example, for a given time interval where two of the three records have incorrect PINs. An attacker does not know the correct PIN and may attempt a guess of the correct PIN from the three records at the time of attempted online impersonation to the authentication server. Since it is likely that the attacker will guess incorrectly the chances of a successful impersonation attack are reduced. (Here, the same set of incorrect PINs is employed for all records, otherwise an attacker would be able to distinguish the correct PIN from the incorrect ones, since the correct PIN would occur in many records, whereas the incorrect ones might not.)

It is understood that various parameters can be readily modified to meet the needs of a particular application. For example, the PIN size, the number of incorrect records, the size of the portion of the PIN that is input to the hash, etc, can be adjusted as desired. The "portion" of the PIN could itself be an arbitrary function of the PIN, rather than just a substring, so that similar PINs likely produce different portions, thereby reducing the chance that a user, due to a typing error, provides an incorrect PIN that has the same portion as the correct PIN. Also, if a portion of the PIN is combined with the token output when constructing the value val_i, e.g., by exclusive-or, that portion of the PIN cannot be recovered (unless the attacker cannot gain access to the real token output by some other means). (See also U.S. Pat. No. 5,168,520 to Weiss.)

In addition, the authentication server can readily detect an attempted impersonation if the attacker provides correct security information (token output) and a 'bad' PIN from one of the incorrect records, or a PIN that has the correct portion, but is otherwise incorrect. This can serve as a silent alarm that an impersonation attack has been attempted. It is understood that the likelihood of an authorized user inadvertently providing the correct token output data together with a PIN from one of the incorrect records, or that has the correct portion but is otherwise incorrect, is or can be made extremely low.

Further, if the authentication server detects some type of irregularity the server can delay and request the next token output. This would place the further burden on the attacker of having to have solved for the next token output as well. It is understood that the server can delay and/or request additional security information based upon a variety of factors including time-of-day, IP address, caller-ID information, time of last login, first login from trip after receiving downloaded records, etc. That is, the server can subject an agent to further scrutiny based upon some type of irregularity. In addition, the server can delay and/or request token outputs on a random basis, such as 10 percent of the time.

EXAMPLE

The verifier stores a small set of records rec_{ij} for each time period i. Here, record r_{ij} equals the previously described value rec_i for one value of j, but not for the others. For the other values of j, the incorrect PIN is combined with the token output to obtain val_i for the record in question. This means that the verifier accepts authentication attempts using the correct token output and a small set of PINs, where only one of these would be the correct PIN for authenticating to the server. The verifier does not have any way of determining whether the correct PIN was used or not, but allows access if any record rec_{ij} was matched. If the verifier gets corrupted by an attacker, the attacker, given sufficient computational efforts, may be able to compute the values val_i for certain time periods, but would not know the value of the PIN. Therefore, if the attacker attempts to impersonate the user at a future time period by attempting authentication to the authentication server, then the security breach can be detected since the server knows that a correct token output used in conjunction with one of a small set of incorrect PINs means that the server was corrupted. This allows the server to take action, which can include alerting the user, restricting access to the user's account, restricting access to the resources associated with the token, etc.

The embodiment above is described in the context of tokens that are non-interactive. It is understood that the invention is readily extendible to tokens that use a challenge-response protocol. For such tokens, each record rec_i (or rec_{ij}) contains a random challenge to be sent to the token, along with the value A_i, which can be a function of the correct reply to this challenge.

The present invention provides a system that enables a user to authenticate to a partially secure machine that is not connected to a secure server. Partially secure refers to a machine that may fall under the control of an attacker. For the verification of the authentication string to be possible, this partially secure machine (verifier) stores some information that allows the verification of authentication strings, whether these are produced in an interactive or non-interactive fashion. If the verifier becomes corrupted by an attacker, which may for example be a malware program or a computer thief, the system limits damage. In particular, the information stored on the verifier does not allow the attacker to successfully impersonate the user to another machine, whether secure or partially secure. To the extent that these impersonation attacks are possible, the duration of time during which they are feasible is limited in time. Moreover, an attempt to perform such an impersonation requires a large computational effort, potentially making it uneconomical to perform within the time the impersonation attempt is meaningful.

Further, attempts to extract secret information and perform impersonation attempts can lead to a discovery of this having taken place. More particularly, the server that the attacker communicates with can discover that an authentication attempt has occurred as a result of a previous security breach of the verifier; this allows for the server to restrict access to the resource by the user, and to otherwise alert the user and others of the problems.

As a general security measure, it may be helpful to include additional information in the records and/or in the input to the hash function which identify the different purposes, as is a standard practice in cryptographic protocol engineering. For instance, the user's name, the token serial number, an identifier for the verifier, and/or an identifier of the authentication server that provided the batch could be included. This is beneficial in several embodiments described below.

Multiple batches of records for different users can be employed at a given verifier, and/or multiple batches for different tokens for the same user. Also, if the user employs the same token with different authentication servers, each could provide its own batch of records for that token, or different authentication servers could share the same batch of records.

As discussed above, the verifier is typically a laptop that is disconnected from an authentication server for some period of time. However, in a more general setting, the verifier could be any computer that wishes to authenticate a user without necessarily connecting to the authentication server. The term "disconnected" should be understood to indicate that (a) the verifier need not be connected to the authentication server in order to perform the authentication; and (b) the verifier need not have a copy of any secrets stored in the user's authentication token. The first aspect provides for high availability and scalability of the authentication system; the second limits the impact of an attack on the verifier.

One may consider a system in which there are multiple verifiers each capable of authenticating one or more users. Each verifier periodically obtains a batch of records for one or more users and/or tokens. The verifier is thereby enabled to authenticate the user for a limited period of time. If the verifier is different than the user's computer, then the user's authentication string would be provided to the verifier; as a typical example, the user could provide the authentication string to the user's computer, which would then forward the string to the verifier, perhaps over a network. In this sense, the user's computer and the verifier are not disconnected from the network, but they are disconnected in the authentication sense in that they do not need to be connected to the authentication server during the authentication operation.

For clarity, in the following, "verifier" is the device that authenticates the user for some purpose according to the methods described herein, and "user's computer" is the device through which the user interacts with other computers in the system, including the verifier. As above, "authentication server" is the server that shares a secret with the user's authentication token.

In other embodiments, al disconnected authentication system utilizes a "subscription" model, where a verifier downloads or otherwise receives batches of records directly from the authentication server on a periodic basis. For instance, batches of records could be provided to a verifier on a daily basis.

An exemplary subscription model is described in B. M. Jakobsson and B. S. Kaliski Jr., "Method and Apparatus for Graph-Based Partition of Cryptographic Functionality," U.S. patent application Ser. No. 10/631,989, filed Jul. 31, 2003, which is incorporated herein by reference, in that it enables a verifier to authenticate a user for a limited period of time. In Jakobsson-Kaliski, the verifier is provided intermediate seeds from which other seeds and/or authentication values such as token outputs may be derived and verified. Here, however, the verifier is provided hash values of token outputs (or information from which they may be generated), and authenticates the user via those hash values. The verifiers with intermediate seeds in Jakobsson-Kaliski can generate a subset of the hash values for local use, and/or provide them to other verifiers.

In another embodiment, a system includes a "session" model, where a verifier obtains a batch of records for a given user only after a successful authentication by the user to the authentication server. The time period covered by the batch would typically correspond to the length of a single user session, e.g., a few minutes to a few hours, depending on security policy. The verifier is capable during the session of re-authenticating the user via the batch of records without requiring an additional connection to the authentication server.

The batch of records can be provided to one or more verifiers directly by the authentication server following the user's successful authentication, similar to the subscription model.

Alternatively, the batch can be provided indirectly to one or more verifiers via the user's computer. Upon the user's successful authentication to the authentication server, the batch would be provided to the user's computer. The user's computer could then immediately or later forward the batch to the verifier.

Batches of records could be included, for instance, in a SAML assertion issued by the authentication server (see "Security Assertion Markup Language (SAML) v1.1", Organization for the Advancement of Structured Information Standards (OASIS), August 2003). The records would afford the verifier a means of obtaining "proof of possession" from the user, i.e., confirmation that user continues to possess authentication credentials (the token in this case) connected with the assertion.

Verifiers can also distribute batches to one another, in a form of "delegation." As one example, an application server could distribute a batch of records to another application server, so that the latter could also authenticate the user, either for purposes of increased availability, or for its own local purposes. As another example, a user's desktop could distribute a batch of records to the user's laptop. The forwarding of batches could continue further down a chain of verifiers.

The distribution of batches assumes some means of authenticating that the batch is correct, i.e., it corresponds to the token's actual authentication strings. Otherwise, an attacker could potentially impersonate the user by constructing a new set of records that it claims is associated with the user, but for which the attacker knows the authentication strings, and providing that batch instead to a verifier. Accordingly, data authentication such as a message authentication code (MAC) or a digital signature should be included, where the MAC or digital signature key is associated with the authentication server or another trusted authority. A verifier would check the correctness of the MAC or digital signature before accepting and employing a batch of records. Alternatively, a secure, server-authenticated channel from the authentication server to the verifier could be employed.

Each record could have its own MAC or digital signature as evidence, though this may impose overhead in terms of computation, storage and transmission. Alternatively, the full batch of records could have a single MAC or signature, but this may require the transmission of the full batch between verifiers, and does not offer as much granularity in the delegation. (For instance, a verifier may wish to delegate only a few hours' worth of records to another verifier, but the batch itself could span a full day. One advantage of this more detailed approach is that it limits the exposure of records, thereby reducing the opportunity for an attacker to obtain records from which to begin a search for the token outputs.)

As a compromise between signing individual records and signing full batches, a variety of hash-type constructions can beneficially be applied. For instance, each record could be treated as a leaf of a hash tree. The leaves would be assembled into a hash tree by standard techniques, and the signature or MAC applied to the root of the tree. In this way, any subset of leaves (i.e., records) could be exchanged among verifiers, together with a path from that subset to the root and the single MAC or signature. The content of the leaves, the number of children at each level, and the number of levels in the tree can be varied as is well understood in the standard techniques. As an example, an hour's worth of records could be collected into one leaf, and 24 leaves hashed together to form a daily root, which is signed. This would give granularity on an hour basis, which may be sufficient for many applications.

It should also be noted that the approaches involving separate verifiers are compatible with the password-hash approaches in B. Kaliski and M. Nystrom, "Password Protection Module" (provisional patent application filed Jul. 28, 2004 having U.S. Provisional Patent Application No. 60/591, 672, and B. Kaliski and M. Nystrom, also entitled "Password Protection Module" (provisional patent application filed Jul. 2, 2004 having U.S. Provisional Patent Application No. 60/584,997 which are incorporated herein by reference). A password (or more generally, an authentication string) is hashed with an application identifier to produce a protected password, which is then provided to the application. (The application identifier is a string specific to a given application of set of applications, e.g., a network address, URL, or domain name for the application.)

The hashing steps prevent a corrupt application from receiving the password directly, which it could then forward to the legitimate application. When multiple verifiers are involved as suggested above, it may be preferable to provide a protected password (i.e., protected authentication strings) to the verifier. This would likewise prevent a corrupt verifier from misusing the information obtained to impersonate the user to other verifiers. The records provided would accordingly be different from one verifier to another, since they would be based on protected authentication strings, which depend on the application identifier as well as the token output.

The confirmation code suggested in Kaliski-Nystrom can readily be accommodated as part of the sensitive data protected via the record. This would prevent an attacker who obtains the record from being able to impersonate the verifier without knowing the authentication string.

The disconnected authentication approach described here is particularly flexible in terms of the authentication architectures it supports. Although the authentication to the disconnected machine itself employs token outputs, after a successful authentication has been accomplished, a key or other sensitive data can be recovered that can be employed for purposes of authentication to other applications. For example, a private signature key may be recovered which can be used in a standard public-key-based authentication protocol such as SSL/TLS (see T. Dierks and C. Allen, "The TLS Protocol Version 1.0", IETF RFC 2246, January 1999), or as "proof-of-possession" for a SAML assertion. Thus, the user can authenticate to applications with standard public-key-based techniques, while possessing only a one-time passcode authentication token, and with reduced risk of compromise of the private signature key on the disconnected machine compared to other approaches. (By contrast, in other approaches, the user may authenticate to a credential server via an authentication token and then download the signature private key, which is then stored, unencrypted, on the user's computer. The approach here is advantageous in that the private key is encrypted with a value derived from token outputs, so that an attacker who obtains access to data on the user's computer cannot readily recover the private key.)

In the case that a private key is employed for authentication to other applications, there could be a single private key per record, a single private key per batch of records, or something in between. Since the corresponding public key would need to be made available to the application, the approach with one private key per batch (and hence a single public key per batch) may have an advantage in terms of key management for many signature schemes. However, certain signature schemes have the property that there may be single private key per record, yet still only one public key per batch.

As one example, a forward-secure signature scheme such as in M. Bellare and S. Miner, "A Forward-Secure Digital Signature Scheme," in M. Wiener, editor, Advances in Cryptology—Crypto '99 Proceedings, Lecture Notes in Computer Science vol. 1666, Springer, 1999, has one public key and a succession of private keys, where later private keys can be computed from earlier ones, but not vice versa. (The verifier can determine the position of the private key employed among the succession of possible private keys.) This is beneficial in that an attacker is prevented from forging what appear to be older signatures given a private key that is compromised at a later time. For the purposes here, the various private keys could be precomputed for the full batch, and then protected with successive records. It may be preferable here to reverse the order of private keys compared to the usual forward-secure sequence, so that an attacker who compromises a private key for a given time interval can only compute the private keys for earlier time intervals. Assuming that the sensitive data for later time intervals has stronger protection than that for earlier time intervals as described above, this approach provides a nice two-level defense for the private keys.

A Merkle or hash-tree signature scheme (see R. Merkle, "Secrecy, Authentication, and Public Key Systems", Ph.D. dissertation, Dept. of Electrical Engineering, Stanford Univ., 1979; also M. Jakobsson, F. T. Leighton, S. Micali, and M. Szydlo, "Fractal Merkle Tree Representation and Traversal," in M. Joye, editor, Topics in Cryptology—CT-RSA 2003 Proceedings, Lecture Notes in Computer Science vol. 2612, Springer, 2003). may also be employed beneficially here, since it also has a single public key (the root) yet different private keys (collections of leaves) for different signature operations, e.g., for each record. This scheme is both forward- and backward-secure; the compromise of a single private key does not enable the computation of any other private keys in either direction.

Many other authentication protocols can be supported. For instance, a shared symmetric key could be recovered for purposes of authenticating to an application. The shared key could be a key in the Kerberos authentication system, for instance. As another example, a session state could be recovered, from which an SSL/TLS session could be resumed. Alternatively, the sensitive data recovered could be a seed for a "virtual" or "soft" authentication token, whose outputs could then be employed to authenticate to other applications. As another example, token outputs for a different token could be recovered. Further, the sensitive data could consist of the inputs to a hash function, where the outputs of the hash function are available to another application and the inputs are provided as evidence of authentication to that application.

As another example, the $B_i$ value itself could serve as a "proof of authentication" to another verifier that also shares the records, for instance a Windows domain controller. The user's computer would present the $B_i$ value obtained from a given token output to the other verifier, and the other verifier would determine whether the $B_i$ value correctly decrypts its copy of the $E_i$ value.

A further example of sensitive data for use in authentication protocols would be a SAML assertion or other signed value, which could be presented to other applications as proof of the user's authentication. One or more SAML assertions could be provided by the authentication server and encrypted for different time intervals. Successful authentications at the verifier would recover such assertions, which would be provided to those other applications. This gives an "self-issuance" capability to the verifier, where a sequence of precomputed assertions is readily obtained at the verifier without interacting with the authentication server. The assertions can therefore potentially have a shorter lifetime and thus be "fresher" than assertions ordinarily issued by the authentication server, while maintaining a relatively long session. (For example, a set of records could be downloaded daily by the verifier from the authentication server, protecting assertions that have a lifetime of only an hour. The user would need to interact with the authentication server only once a day, and would need to authenticate to the verifier once an hour to obtain a fresh assertion.)

Following techniques in B. S. Kaliski Jr., "Client/Server Protocol for Proving Authenticity," U.S. Pat. Nos. 6,085,320 and 6,189,098, it is not necessary to encrypt an entire SAML assertion. Rather, it can be sufficient to encrypt only the information necessary to verify the assertion, such as a signature on the assertion, or an input to a hash function where the output of the hash function is part of the assertion.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method for authenticating at a verifier a user who possesses an authentication token capable of providing one or more one-time passcodes, comprising:
    obtaining a verification record from an authentication server;
    obtaining a passcode from the authentication token submitted to authenticate the user at the verifier, wherein the one-time passcodes are generated as a function of a token secret, and wherein the verifier is isolated from the token secret; and
    determining whether the submitted passcode is consistent with the verification record, where the verification record is a function of a reference passcode, wherein the verifier is disconnected from the authentication server which provided the verification record.

2. The method according to claim 1, wherein the verifier is a personal computer.

3. The method according to claim 1, wherein the token secret is updated in response to an event.

4. The method according to claim 1, wherein the one-time passcodes are generated as a function of a time variable.

5. The method according to claim 1, wherein the one-time passcodes are generated as a function of an event variable.

6. The method according to claim 1, wherein the passcodes are generated as a function of a challenge value.

7. The method according to claim 1, wherein the one-time passcodes are generated as a function of a PIN.

8. The method according to claim 1, wherein a function for generating the one-time passcodes comprises generating a tokencode from the token secret and combining the tokencode with the PIN.

9. The method according to claim 1, wherein the one-time passcodes are generated as a function of a token secret stored at an authentication server.

10. The method according to claim 9, wherein the token secret is stored in the authentication token.

11. The method according to claim 1, wherein the authentication server generates at least part of the reference passcode.

12. The method according to claim 1, wherein the authentication token generates at least part of the submitted passcode.

13. The method according to claim 1, wherein one or more tokencodes are stored in the authentication token, and the submitted passcode is obtained as a function of one of said tokencodes.

14. The method according to claim 1, wherein the verification record is obtained from an intermediary, and wherein the intermediary obtains the verification record from the authentication server.

15. The method according to claim 14, wherein the intermediary is a personal computer.

16. The method according to claim 14, wherein the intermediary is an application server.

17. The method according to claim 1, wherein the verification record is obtained as part of a data structure comprising a plurality of verification records.

18. The method according to claim 1, wherein the verification record is obtained as part of an authenticated data structure.

19. The method according to claim 18, wherein the authenticated data structure is a SAML assertion.

20. The method according to claim 1, wherein the verification record is stored at the verifier.

21. The method according to claim 1, wherein at least part of the submitted passcode is obtained via user interaction.

22. The method according to claim 1, wherein at least part of the submitted passcode is obtained via a wired and/or wireless communications link.

23. The method according to claim 1, wherein consistency of the submitted passcode is determined with respect to a plurality of verification records.

24. The method according to claim 1, wherein the function for generating the verification record comprises a cryptographic hash function.

25. The method according to claim 24, wherein the cryptographic hash function is iterated multiple times.

26. The method according to claim 24, wherein the function for generating the verification record comprises a cryptographic time-lock puzzle.

27. The method according to claim 24, wherein the verification record comprises a reference hashed passcode, where the reference hashed passcode is the result of applying a one-way function to the reference passcode.

28. The method according to claim 1, wherein the verification record comprises an encrypted data element, where the encrypted data element is the result of encrypting a data element with a key, and where the key is the result of applying a one-way function to the reference passcode.

29. The method according to claim 28, further including
applying the one-way function to the submitted passcode to obtain a key;
decrypting the encrypted data element with the key to recover the data element; and
determining consistency based at least in part on whether the decryption operation is successful.

30. The method according to claim 28, further including
applying the one-way function to the submitted token code to obtain a key;
decrypting the encrypted data element with the key to recover the data element;
using the data element; and
determining consistency based at least in part on whether the usage of the data element is successful.

31. The method according to claim 28, wherein the data element comprises a Windows password.

32. The method according to claim 28, wherein the data element comprises at least part of a pepper value for another authentication operation.

33. The method according to claim 28, wherein the data element comprises a hint value for another authentication operation.

34. The method according to claim 28, wherein the data element comprises a second key.

35. The method according to claim 34, further including obtaining a second encrypted data element, where the second encrypted data element is the result of encrypting a second data element with the second key.

36. The method according to claim 35, wherein the second data element comprises a Windows password.

37. The method according to claim 35, wherein the second data element comprises a hint value.

38. The method according to claim 35, wherein the data element comprises sensitive data.

39. The method according to claim 1, wherein input to the function for generating the verification record also comprises a function of a PIN value.

40. The method according to claim 39, wherein the function of the PIN value contains less information than the entire PIN value, such that more than one PIN value is consistent with the verification record.

41. The method according to claim 40, wherein verification records generated from incorrect PINs are also stored at the verifier.

42. The method according to claim 1, wherein the input to the function for generating the verification record also comprises a salt value.

43. The method according to claim 42, wherein the verification record comprises the salt value.

44. The method according to claim 42, wherein part or all of the salt value is included in another verification record.

45. The method according to claim 44, further including testing consistency with salt values from one or more other verification records.

46. The method according to claim 1, wherein input to the function for generating the verification record also comprises a pepper value.

47. The method according to claim 46, further including testing consistency for one or more possible pepper values.

48. The method according to claim 1, wherein the input to the function for generating the verification record also comprises a hint value.

49. The method according to claim 48, wherein the hint value is recovered from one or more other authentication operations.

50. The method according to claim 1, further including encrypting the verification record to produce an encrypted verification record,
obtaining a decryption key; and
decrypting the encrypted verification record to recover the verification record.

51. The method according to claim 50, wherein the decryption key is derived from an emergency access code.

52. The method according to claim 50, wherein the decryption key is derived from a key recovered in another verification operation.

53. The method according to claim 1, wherein input to the function for generating the verification record also comprises at least part of a second reference passcode.

54. The method according to claim 53, further including testing consistency of the verification record with both of the reference passcode and the at least part of the second reference passcode.

55. The method according to claim 1, wherein the authentication token is a software token implemented on a computer.

56. The method according to claim 1, further including increasing over time an amount of work required to compute the verification record in an attack.

57. A method for disconnection authentication, comprising:
   receiving verification records from an authentication server by an authenticated computer connected to the authentication server;
   storing the verification records on the computer, wherein the verification records correspond to a period of time and/or an event and include information corresponding to passcodes;
   receiving a passcode from an authentication token submitted by a user of the computer, which is disconnected from the server, wherein the passcode is generated as a function of a token secret, and wherein the verifier is isolated from the token secret; and
   determining whether the submitted passcode corresponds to a given one of the verification records to authenticate the user and allow the user to use the computer.

58. A method for authenticating at a laptop computer a user who possesses an authentication token capable of providing one or more one-time passcodes, comprising:
   obtaining a verification record from an authentication server;
   obtaining a passcode from the authentication token submitted to authenticate the user at the laptop, wherein the passcode is generated as a function of a token secret, and wherein the laptop computer is isolated from the token secret; and
   determining whether the submitted passcode is consistent with the verification record, where the verification record is a function of a reference passcode, wherein the laptop computer is disconnected from the authentication server which provided the verification record, and disconnected from all network connections.

59. A method for authenticating at a verifier a user who possesses an authentication token capable of providing one or more one-time passcodes, comprising:
   obtaining a verification record from an authentication server;
   obtaining a passcode from the authentication token submitted to authenticate the user at the verifier; and
   determining whether the submitted passcode is consistent with the verification record, where the verification record is a function of a reference passcode, wherein the verifier is disconnected from the authentication server which provided the verification record.
   wherein determining whether the submitted passcode is consistent with the verification record includes:
   applying a one-way function to the submitted passcode to obtain a hashed passcode;
   comparing the hashed passcode to a reference hashed passcode; and
   determining consistency based at least in part on the whether the comparison is successful.

* * * * *